United States Patent [19]

Cederqvist

[11] 4,284,471
[45] Aug. 18, 1981

[54] METHOD FOR THE PRODUCTION OF A FIBROUS MAT

[75] Inventor: Gummar Cederqvist, S Lerdala, Sweden

[73] Assignee: Rockwool Aktiebolaget, Skovde, Sweden

[21] Appl. No.: 122,184

[22] Filed: Feb. 19, 1980

Related U.S. Application Data

[63] Continuation of Ser. No. 942,698, Sep. 15, 1978, abandoned.

[30] Foreign Application Priority Data

Sep. 28, 1977 [SE] Sweden .................................. 7710857

[51] Int. Cl.³ ............................................. D21F 11/00
[52] U.S. Cl. ................................ 162/152; 162/168 R; 162/169; 162/185; 162/205
[58] Field of Search ............... 162/145, 155, 152, 183, 162/184, 185, 186, 168 R, 205, 169

[56] References Cited

U.S. PATENT DOCUMENTS

| 2,732,295 | 1/1956 | Hollenberg | 162/152 |
| 2,773,763 | 12/1956 | Scott | 162/145 |
| 3,950,218 | 4/1976 | Levesque | 162/184 |
| 4,072,558 | 2/1978 | Allevson | 162/145 |
| 4,081,318 | 3/1978 | Wietsma | 162/169 |
| 4,159,224 | 6/1979 | Cederqvist et al. | 162/145 |
| 4,193,841 | 3/1980 | Cederqvist et al. | 162/152 |

FOREIGN PATENT DOCUMENTS

707946  4/1954  United Kingdom ..................... 162/155

Primary Examiner—William F. Smith
Attorney, Agent, or Firm—Larson and Taylor

[57] ABSTRACT

A suspension of artificial mineral fibers and cellulosic fibers is dewatered during shaping on a wire. The sheet is thereafter pressed and dried. A latex emulsion binder is added to the mat after the mat has been partially dried to a solids content of 60 to 90%. The mat product has physical properties, including impression resistance, comparable to previously known asbestos-containing products.

26 Claims, 1 Drawing Figure

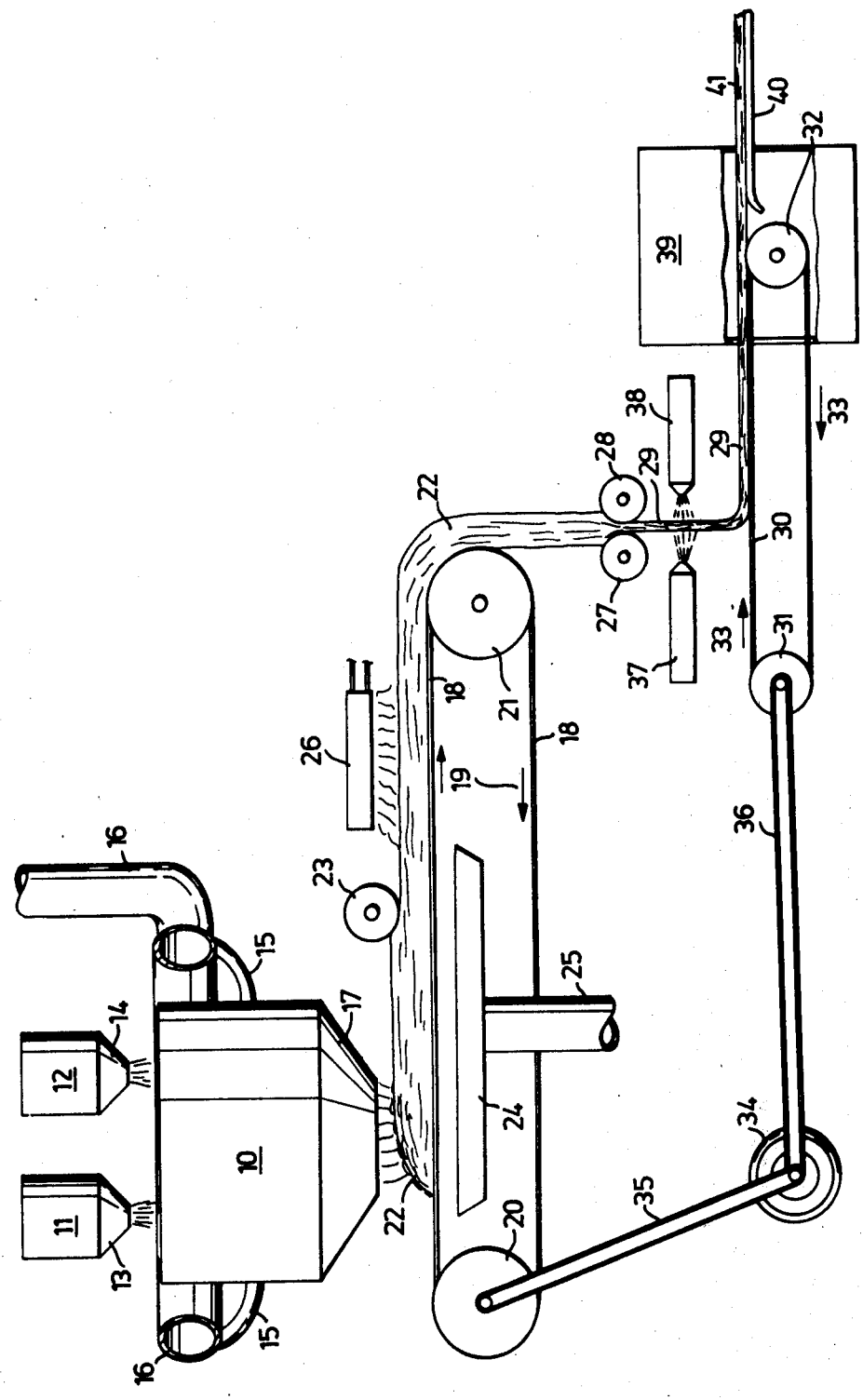

METHOD FOR THE PRODUCTION OF A FIBROUS MAT

This is a continuation of the application Ser. No. 942,698 filed Sept. 15, 1978, now abandoned.

The present invention relates to a method for the production of a fibrous mat, particularly such mats intended for use as a carrier or a support for a wall or a floor construction of plastic, in which a mixture of mineral fibrous material and cellulosic material is used as the starting material. From these materials, thereafter, a suspension in water is prepared, whereafter it is de-watered under shaping of sheets on a wire followed by pressing and drying.

Methods of the above mentioned type have already been proposed. In tests made with these known methods, however, it has proved that their purpose has not been satisfied in all respects. Their purpose, as a matter of fact, has been to create a material for the above mentioned use to be used as a substitute for earlier commonly used material containing asbestos. It has been found that the treatment of asbestos-containing materials is dangerous to health to a very high degree, and that even the existence of asbestos material in a building may to some extent be detrimental for persons living in the said building. It has therefore been important to create a substitute material, which would possess all of the advantageous properties of asbestos-containing material previously used but which does not possess any of its unfavorable properties.

Asbestos fiber is a mineral fiber. It is provided with an uneven surface, having barb-like extensions which cause, on the one side, a good grip between the fibers in an asbestos disc or plate, but, on the other side, the barb-like extensions may easily become free from the asbestos formation. This is especially the case during the production of the material and during working of the fabricated plate or disc, for instance by sawing or cutting for adapting its shape to a particular need. Moreover, particles of asbestos may easily get free from the formation during transportation or the like and it is just these particles freely hovering in the air which, when breathed in, may cause severe body damage.

By the above-mentioned previously known methods, it is now possible to make discs or plates of mineral wool with properties closely similar to the properties of the known asbestos discs or plates and this especially is a consequence of controlled intermixing of cellulosic fibers with the mineral wool material.

In one of the said methods, attention has been given to the properties of moisture resistance, heat resistance, and resistance to heat variations as well as strength in different directions in which the formation may be subjected to strains, and it has proved possible to produce formations which, in these respects, are completely comparable with previously known asbestos-containing products.

Regard was also given to the property of impression resistance of the product, and certain measurements of the impression resistance of products, produced in the laboratory were also reported. By "impression resistance" is meant the ability of the product, after an impression has been made therein, to re-assume its initial shape when an applied, impression-causing load is released.

Tests have shown that even if one could rather successfully meet the demand of given properties of rigidity in the product, this was nevertheless not the case regarding impression resistance. However, it should be observed that in the tests previously made, no regard was taken to the time at which the binding means was fed to the dried fibrous mat, and investigation of this matter has led to the present invention. This investigation has shown that an essential improvement of the impression resistance may be obtained if the binding means are added to the fibrous mat in the form of a latex emulsion, and if the binding means are added only at a time after the fibrous mat has been pre-dried to a given degree, whereafter it is finally dried. The degree to which the pre-drying should take place has proved to be between 60 and 90 percent dry contents, preferably about 80%. With such a treatment, one will get an impression resistance which is so close to complete as one could reasonably expect, the impression returning to such an extent that only a few percent of the created impression will remain.

The invention thus relates to a method for the production of a fibrous mat especially intended as a carrier or a support for wall or floor covers starting from a mixture comprising mineral fibers and cellulosic fibers, from which a suspension in water is prepared. The suspension is de-watered on a wire during shaping into sheet form, and thereafter the sheet is pressed and dried.

According to the invention, binding means is fed to the fibrous mat in the form of a latex emulsion after the mat has been pre-dried to between 60 and 90% dry contents, preferably about 80%. Thereafter, the final drying is carried out.

It may be suitable to add some different materials to the suspension. Such materials include pre-binding means, for instance in the form of an acrylate, whereby it will be more easy to treat the still wet fibrous mat, filler means, dye stuffs, thickening means, foam creating means or foam preventing means, and so on.

According to the especially advantageous form of execution of the said method, the fibrous mat is caused to pass through a horizontal press, comprising at least two pressure rollers having horizontal shafts which are applied in the same level of height, between which the fibrous mat is brought to pass from the upper side and downwardly. The arrangement is provided with means for feeding the latex emulsion to both sides of the fibrous mat.

The fibrous mat may be compressed between the pressure rollers sufficiently to cause a decrease of its thickness of between 25 and 60%, preferably about 50%.

The latex emulsion is preferably supplied in such an amount that the amount of binding means in the finally dried product, emanating from the latex emulsion, will form between 15 and 30%, preferably about 25%, based on the weight of the fibrous mat. The latex emulsion may possess a content of dry material of between 30 and 50%, preferably about 40%.

The latex emulsion which is added after the mentioned pre-drying, is preferably a styrene-butadiene-latex, and, further preferably such a latex of heat reactive type, such that it will be brought to bind by the heat, used to carry out the subsequent complete drying of the sheet.

The starting material of mineral fibers and cellulosic fibers used should comprise at least one half part of mineral fibers, preferably however, a little more, e.g. 55%, and the mineral fibers should have a mean diameter of between 3 and 6 micrometers. The cellulosic fibrous material, which may be a mixture known per se of long fiber cellulose and short fiber cellulose, so called zero fibers, advantageously may be un-bleached sulphate pulp mass. At least one half part of the cellulosic material should comprise such un-bleached sulphate pulp mass, and about one half part of the cellulosic fibrous material, preferably about 45%, may be formed either by zero fibers or by ground, short fibrous waste material. If the material is formed of un-bleached sulphate pulp, the degree of grinding of the short fibrous part of the cellulosic material should be between 65° and 75° SR, preferably about 70° SR. However, if the material comprises ground waste fibers, the degree of grinding should be between 36° and 45° SR, preferably about 40° SR.

In this connection, it should be mentioned that the invention is based on an extensive series of tests, and that it is therefore entirely based on empirical observations. Therefore, there is no theoretical support for the stated values.

The attached drawing shows an arrangement for carrying out the method of the invention.

In the drawing, a mixer 10 is provided to be supplied from two separate containers 11 and 12, each per se provided with a controllable sluice 13 and 14, respectively. Container 11 contains mineral fibers and container 12 contains cellulosic fibers. Mixer 10 is provided with a number of feeder tubes 15 for water and, optionally, for a binder preparation means for forming an aqueous emulsion. Water and the optional binder are fed from a conduit 16. At the lower end of the mixer 10, a sluice 17 is provided for letting out the emulsion prepared in the mixer onto a moving band 18 in the form of a wire. Wire 18 moves in the direction of the arrows 19 over a driver roller 20 and an idle roller 21. Above the portion of band 18, which carries the deposited fibrous mass 22 which shall form the disc or plate, there are located firstly a de-watering roller 23 with its collection trough with outlet 24 into a waste conduit 25 and secondly an electric radiation element 26 for partial drying of the web of material deposited on the band in accordance with the invention.

Web 22 is thereafter conducted downwardly over roller 21 to a press comprising the two rollers 27 and 28. In reality, such a press usually comprises more than one single pair of rollers, but for simplification of the description, the press has been shown as if it only comprises two rollers. In this way, the web 22 is compressed to an essentially less thickness in the form of web 29, which is deviated to follow a second moving band 30, driven by roller 31 and running idly over roller 32 in the direction of the arrows 33.

The two driving rollers 20 and 31 of the wire and the band 30, respectively, are driven in common by a motor 34 by belts 35 and 36 respectively.

On each side of web 29, now freely hanging down below press rolls 27, 28, shower devices 37 and 38, respectively are provided to spray the latex emulsion binder onto the partially dried web in accordance with the invention. In this state, web 29 which carries the applied latex emulsion, is deposited on the band 30, by means of which it is brought to a drying oven 39 for final drying. After final drying, the web becomes of more solid, disc shaped or plate shaped consistency, and it is no longer necessary to support it by means of the band 30. The dried product is therefore transferred to the feed-out table 40, on which the ready made disc or plate 41 is fed out.

What is claimed is:

1. In a method of production of an asbestos-free fibrous mat in which a suspension comprising artificial mineral fibers, cellulosic fibers, and resin binder is dewatered during shaping into mat form on a wire, wherein the dewatered mat is subsequently compressed and dried, the compression being sufficient to cause a substantial reduction in thickness of the mat, the improvement wherein the de-watered mat is partially dried to a dry content of between 60 and 90%, wherein a latex emulsion binder is applied to the partially dried mat, and wherein the latex-bearing partially dried mat is subsequently further dried to effect final drying, whereby the impression resistance of the mat product is substantially increased.

2. An improved method according to claim 1 in which the mat is dried to about 80% dry contents, before the latex emulsion is added thereto.

3. An improved method according to claim 1, in which the resin binder comprises an acrylate.

4. An improved method according to claim 1, in which at least one member selected from the group consisting of fillers, dye-stuffs, foam producers and foam preventers, is added to the fibrous mat.

5. An improved method according to claim 1, in which the fibrous mat is moved between rollers of a horizontal press, comprising at least two cooperating rollers having horizontal shafts applied in the same level of height and between which the fibrous mat is moved from above and downwardly.

6. An improved method according to claim 1, in which the latex emulsion binder is applied onto the opposite sides of the partially dried mat.

7. An improved method according to claim 6, wherein the emulsion is sprayed onto the mat.

8. An improved method according to claim 5, in which the fibrous mat is compressed between pressure rollers to effect decrease of its thickness by between 25 and 60%.

9. An improved method according to claim 8, in which the fibrous mat is compressed by about 50%.

10. An improved method according to claim 1, in which the latex emulsion is added by such an amount, that, in the finally dried product, the amount of binder means emanating from the latex emulsion will form between 15 and 30% of the weight of the fibrous mat.

11. An improved method according to claim 10, in which the latex emulsion has a content of dry substance of between 30 and 50%

12. An improved method according to claim 11, in which the latex emulsion has a content of dry substance of about 40%.

13. An improved method according to claim 1, in which the latex emulsion comprises styrene-butadiene-latex.

14. An improved method according to claim 13, in which the styrene-butadiene-latex is of the heat reactive type, and in which the binder is activated by heat used in finally drying the mat.

15. An improved method according to claim 1, in which at least one half of the treated fibrous mat comprises mineral fibers.

16. An improved method according to claim 15, in which the treated fibrous mat comprises about 55% of mineral fibers.

17. An improved method according to claim 15, in which the artificial mineral fibers have a mean diameter of between 3 and 6 micrometers.

18. An improved method according to claim 1, in which the cellulosic fibrous material comprises a mixture of long fibrous cellulose and short fibrous cellulose.

19. An improved method according to claim 18, in which at least part of the fibrous cellulose material comprises un-bleached sulphate cellulose.

20. An improved method according to claim 19, in which about one half of the fibrous cellulosic material comprises un-bleached sulphate cellulose.

21. An improved method according to claim 18, in which about half of the fibrous cellulosic material comprises short fibrous cellulose.

22. An improved method according to claim 21, in which about 45% of the fibrous cellulosic material comprises short fibrous cellulose.

23. An improved method according to claim 18, in which the short fibrous cellulose material comprises at least one member selected from the group consisting of zero fibers and ground cellulosic waste material.

24. An improved method according to claim 23, in which the ground waste material comprises un-bleached sulphate cellulose.

25. An improved method according to claim 23, in which the ground waste fibrous material of cellulose has a coarseness of between 36° and 45° SR.

26. An improved method according to claim 1 wherein the latex emulsion binder is applied to said mat after the mat is pressed to effect a substantial reduction in mat thickness.

* * * * *